3,652,621
**CONTINUOUS PRODUCTION OF ORGANO-
ALUMINUM COMPOUND**
Eiichi Ichiki, Kazuo Iida, and Aturo Matui, Niihama,
Japan, assignors to Sumitomo Chemical Company, Ltd.,
Osaka, Japan
Continuation-in-part of application Ser. No. 680,321,
Nov. 3, 1967. This application May 21, 1970, Ser.
No. 39,211
Int. Cl. C07f 5/06
U.S. Cl. 260—448 A                 7 Claims

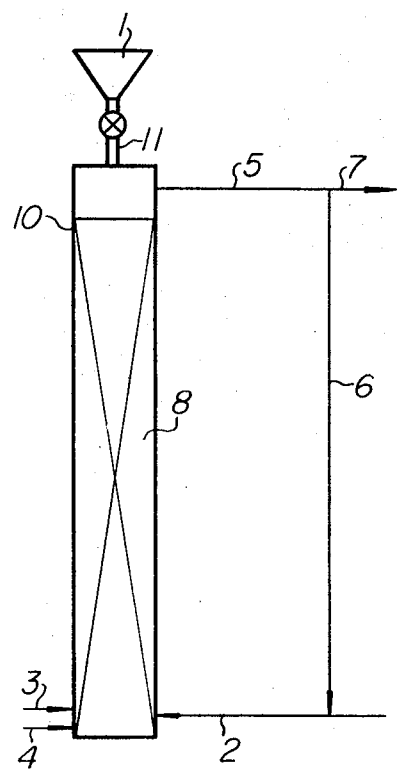

ABSTRACT OF THE DISCLOSURE

In a process for synthesizing an alkylaluminum compound by reacting aluminum, hydrogen and an olefin, or aluminum and hydrogen in the presence of trialkylaluminum as a catalyst, the alkylaluminum compound is economically produced in a continuous manner by introducing a trialkylaluminum compound, hydrogen or an olefin to the lower part of a column-type reactor packed with aluminum cut pieces having an apparent specific surface area of not more than 60 cm.$^2$/g. for effecting reaction and withdrawing the formed alkylaluminum compound from the upper part of the reactor.

CROSS-REFERENCE TO RELATED APPLICATION

This is a continuation-in-part application of the copending application Ser. No. 680,321, filed on Nov. 3, 1967 and now abandoned.

BACKGROUND OF THE INVENTION

Field of the invention

This invention relates to a process for producing continuously a dialkylaluminum hydride or a trialkylaluminum, and more particularly to an improvement in a process for producing continuously a dialkylaluminum hydride or a trialkylaluminum by reacting aluminum and hydrogen, or aluminum, hydrogen and an olefin in the presence of a trialkylaluminum as a catalyst.

DESCRIPTION OF THE PRIOR ART

As is well known, K. Ziegler et al. found a process for producing a dialkylaluminum hydride or a trialkylaluminum by reacting aluminum and hydrogen, or aluminum, hydrogen and an olefin in the presence of a trialkylaluminum as a catalyst [for example, see "Angew. Chem." vol. 67, No. 16, page 424 (1955)].

A process for continuously synthesizing such alkylaluminum compound is known from U.S. Pat. No. 3,000,919. According to said process, aluminum activated with a halogen gas or a halogen compound is filled in a column-type reactor provided with a perforated plate at the bottom of the reactor, and a trialkylaluminum as a catalyst, hydrogen and an olefin are introduced into the upper part of the reactor for effecting the reaction. The formed alkylaluminum compounds and aluminum made finer by the reaction are withdrawn from the lower part of the reactor, and the alkylaluminum is obtained by separating it from the fine aluminum. However, in carrying out said process, the aluminum made finer in the course of the reaction clogs the perforations of the perforated plate, and the flow rate of effluent reaction product solution is liable to fluctuate. Thus, no stable operation can be expected.

Furthermore, according to said process, a large amount of aluminum made finer by the reaction is contained in the product trialkylaluminum, because the trialkylaluminum as the catalyst and an olefin are allowed to pass in the direction of the gravity. Consequently, clogging is liable to take place in the pipes or at valves in the lines for withdrawing the product trialkylaluminum or recycling the alkylaluminum compounds, and a continuous, stable operation becomes difficult for a prolonged period of time. Furthermore, a large amount of the raw material aluminum is liable to take place. As the relevant reaction is exothermic, side reaction that converts the olefin to paraffin will take place to a considerable degree, unless the heat of reaction is effectively removed from the reactor. According to said process the aluminum is not sufficiently dipped with reaction media such a trialkylaluminum and olefin, but reaction media only attaches to the surface of the aluminum. Thus, the heat of reaction cannot be effectively removed, and a chance for the side reaction is considerably increased. These are the disadvantages of the prior art process.

SUMMARY OF THE INVENTION

An object of the present invention is to provide an improved process for continuously producing dialkylaluminum hydride or trialkylaluminum. That is to say, the object of the present invention is to provide a process for economically producing an alkylaluminum compound in a continuous manner, which comprises filling aluminum cut pieces having an apparent specific surface area of not more than 60 cm.$^2$/g. as a raw material in a column-type reactor, introducing a trialkylaluminum as a catalyst, hydrogen and, if necessary an olefin into the reactor from the lower part thereof for effecting reaction, and withdrawing the resulting alkylaluminum compound from the upper part of the reactor.

The term "apparent specific surface area" referred to herein is defined to be a surface area per weight, where the surface area is calculated, for example, from a length, a width and a thickness for a plate-shaped piece or from a diameter for a spherical piece.

The term "aluminum cut piece" referred to herein is defined to an aluminum cut piece prepared by a lathe, a milling machine, a drilling machine, a shaper, a slotter or the like and is distinguished from a block or powders prepared by casting or atomizing.

BRIEF DESCRIPTION OF THE DRAWING

The accompanying drawing shows a column-type reactor used in the present invention.

DESCRIPTION OF THE PREFERRED EMBODIMENTS

The present invention will be explained in detail, referring to the accompanying drawing, especially in view of the reacting materials used in carrying out the present invention, flow of the reacting materials and reacting conditions.

In the drawing, a column-type reactor 10 is provided with an aluminum feeding device 11 at the top of the reactor, an outlet line 5 for withdrawing formed alkylaluminum compound, an inlet line 2 for introducing trialkylaluminum as a catalyst at the lower part of the reactor, an inlet line 3 for hydrogen and an inlet line 4 for olefin. It is not necessary to use the inlet line 4 for olefin, when a dialkylaluminum hydride is to be prepared.

In order to prevent the product alkylaluminum compound from contamination with aluminum made finer by the reaction, it is desirable to use a column-type reactor whose upper section has a larger inner diameter than that of the aluminum-packed layer section 8, or a column-type reactor having a wire-net or a perforated plate at the position to which the outlet line 5 for withdrawing the product alkylaluminum compound is connected. Usually, a reactor having a ratio of height to inner diameter of not less than 3, particularly preferably more than 10, is used. The reaction can be carried out in a single reactor or a plurality of reactors connected in series.

Aluminum cut pieces having an apparent specific surface area of not more than 60 cm.$^2$/g., particularly preferably 50 to 10 cm.$^2$/g., are used in the present invention. The aluminum cut pieces are prepared by a lathe, a milling machine, a drilling machine, a shaper, a slotter or the like. The present inventors have found that the thus prepared aluminum cut pieces have a reaction activity per apparent specific surface area at least two times as high as that of the aluminum pieces prepared by casting or atomizing.

A process for synthesizing an alkylaluminum compound very advantageously has been made possible by a combination of said finding with other conditions.

When said aluminum cut pieces having larger sizes are used in the reaction, the amount of the aluminum fine particle which is contained in the formed alkylaluminum compound is almost negligible. Thus, the present invention is very economical.

The raw material aluminum cut pieces 1 are intermittently or continuously introduced into the upper part of the reactor through the feeding device 11, and led to the packed layer 8 as shown in the drawing. Thus, there take place no cloggings in the pumps or valves as seen when the conventional raw material aluminum powders are supplied to the reactor in a slurry state, and consequently there is no trouble in the continuous operation.

The raw material aluminum cut pieces can be supplied to the reactor, after activated in advance, or can be activated in the reactor. As an activating agent, for example, metal of the Group Ia, IIa or III of the Periodic Table or their compounds can be used. The aluminum cut pieces can be also used even in a non-activated state, but in such a case, the start of reaction is retarded.

As the trialkylaluminum to be introduced into the reactor as the catalyst, such trialkylaluminum having an alkyl group having 2 to 20 carbon atoms, as triethylaluminum, tripropylaluminum, tri-n-butylaluminum, tri-isobutylaluminum, tripentylaluminum, trihexylaluminum, tri-2-ethylhexylaluminum, etc. can be used. These trialkylaluminums can be used alone or in a mixture thereof. Furthermore, these trialkylaluminums can be used in a mixture with such an organic solvent as hexane, heptane, or the like. However, it is not always necessary to introduce into the reactor the trialkylaluminum in the form of trialkylaluminum as the catalyst. That is, it can be introduced into the reactor in the forms of dialkylaluminum hydride and an olefin and a trialkylaluminum may be formed in the reactor. The trialkylaluminum is introduced into the reactor from the line 2 connected to the lower part of the reactor. A portion of the trialkylaluminum, the olefin and/or the organic solvent can be introduced to the middle part of the reactor divisionally to effectively remove the heat of reaction.

When the trialkylaluminum is introduced into the reactor from the lower part thereof in this manner, the inside of the reactor is completely filled with a reacting solution and the reaction is carried out in such a state. Consequently, the heat of reaction can be effectively removed in the present invention, as compared with the case where the reaction is carried out in such a state that the aluminum surfaces are wet with the reacting solution, as disclosed in U.S. Pat. No. 3,000,919. Thus, the operation can be carried out smoothly in the present invention. This means that a chance for such a side reaction as given below can be reduced to a considerable degree:

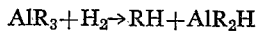

$$AlR_3 + H_2 \rightarrow RH + AlR_2H$$

wherein R represents an alkyl group.

The hydrogen gas is introduced into the reactor from the line 3 connected to the lower part of the reactor. The introduction of the hydrogen gas into the reactor from the lower part thereof can bring about such an advantage that the contact of aluminum and trialkylaluminum with hydrogen can be carried out efficiently. The hydrogen pressure in the reactor is maintained at 40–300 kg./cm.$^2$, particularly 50–150 kg./cm.$^2$. The temperature of the reactor is maintained at 100°–200° C., particularly 110°–160° C. The formed alkylaluminum compound is withdrawn from the upper part of the reactor through the line 5. Thus, contamination of the formed alkylaluminum compound with a large amount of the aluminum made finer by the reaction, which is observed when the formed alkylaluminum compound is tanken out from the reactor in a direction of the gravity, can be prevented. The effluent solution consists mainly of unreacted trialkylaluminum, formed dialkylaluminum hydride and very small amounts of fine aluminum residue, hydrocarbon and hydrogen. The effluent solution can be used in a certain application after it has been degasified and separated from the fine aluminum residue. However, the effluent solution is generally allowed to come in contact with a suitable olefin in an olefin addition reactor (not shown in the drawing) provided in the course of the line 5, to convert the formed dialkylaluminum hydride to trialkylaluminum, and then withdrawn from the line 7 as a product, or can be reused as a raw material for the reaction by leading it through the lines 6 and 2 to the reactor 10.

In the foregoing, a process for synthesizing a di-alkyl-aluminum hydride has been explained, but it is readily comprehensible that the present process can be also applied to a synthesis of a trialkylaluminum in one stage. That is, in a process for synthesizing a trialkylaluminum in one stage, aluminum, a trialkylaluminum, hydrogen and an olefin are used as raw materials and treated under the reacting conditions similar to those for synthesizing said dialkylaluminum hydride.

Olefins having 2 to 20 carbon atoms, such as ethylene, propylene, isobutylene, butene-1, 2-ethylhexene-1, 3-methylhexene-1, 2-ethyl - 4 - methylpentene-1, butene-2, octene-2, or the like can be used alone or in a mixture as the raw material olefin. Furthermore, these olefins can be used in a mixture with such an inert solvent as paraffins, etc.

The olefin is introduced into the reactor from the line 4 connected to the lower part of the reactor.

A molar ratio of the olefin to the trialkylaluminum as a catalyst, which are introduced in the one-stage synthesis of the trialkylaluminum, is a very important condition for reducing the proportion for occurrence of a side reaction, that is, hydrogenation of the olefin and economically synthesizing trialkylaluminum. That is to say, if the molar ratio is smaller, the proportion for the occurrence of the side reaction is increased, resulting in the loss of olefin. On the other hand, if the molar ratio is too large, the amount of recycle olefin is unduly increased and the process becomes uneconomical. Thus, the molar ratio of the olefin to the trialkylaluminum usually used in the present invention is 0.5 to 50, particularly preferably 1 to 20.

The formed trialkylaluminum is withdrawn from the upper part of the reactor through the line 5. The thus obtained trialkylaluminum is recycled to the reactor as the catalyst through the lines 6 and 2 or withdrawn as a product through the line 7, as it is, or after it has been degasified or separated from the hydrocarbon and a very small amount of fine aluminum residue.

As explained in detail, various problems encountered in the conventional process have been solved in the present invention by using aluminum cut pieces of larger sizes and a column-type reactor, and further by limiting the feeding positions of trialkylaluminum as a catalyst, hydrogen and olefin and the withdrawing position of the formed alkylaluminum compound. For example, the solution is passed through the reactor from the bottom upwards in the present invention, and thus clogging of the perforated plate with the aluminum made finer by the reaction and the resulting fluctuation in the liquid flow or in reaction or decrease in the efficiency of the reaction, as seen in U.S. Pat. No. 3,000,919, are not brought about.

Further, in the present invention, the formed alkylaluminum compound is taken out of the reactor as an ascending stream, and thus the amount of aluminum, which has been made finer by the reaction and contained in the product alkylaluminum compound, can be made very small. That is, separation of the unreacted aluminum residue from the formed alkylaluminum compound withdrawn from the reactor can be made readily, and no cloggings take place at all in the pipes and valves.

Furthermore, in the present invention, the reaction is carried out in a liquid phase, and the removal of the heat of reaction can be carried out readily. Thus, the occurrence of the side reaction can be prevented to a considerably degree.

Still furthermore, in the present invention the reaction is not carried out in such a state that aluminum is suspended in a reacting solution, and thus the amount of aluminum in the reactor can be considerably increased. Consequently, the volume efficiency is increased, and the apparatus cost can be remarkably decreased. These are the advantages of the present invention. According to the present invention an alkylaluminum compound can be very economically produced in a continuous manner.

Now, the present invention will be explained in detail, referring to examples, to which the present invention should not be interpreted as limitative.

The present invention can be varied within the scope and spirit of the present invention

EXAMPLE 1

35 kilograms of lathe waste aluminum having an apparent specific surface area of 10–40 cm.$^2$/g. were packed in a column-type reactor having a height of 3 m. and a capacity of 45 l., and diisobutylaluminum hydride containing 1% sodium ethoxide was charged therein to such an extent that the aluminum was immersed therein. Activation was carried out at a temperature of 140° C. under a pressure of 50 kg./cm.$^2$ gage for three hours. Then, hydrogen gas was fed to the lower part of the reactor from the line 3 and compressed to 100 kg./cm.$^2$ gage. 1.1 kg./hr. of triisobutylaluminum as a catalyst was introduced to the lower part of the reactor from the line 2 and 3 kg./hr. of a butene gas mixture containing 70% by mole of isobutylene was introduced to the lower part of the reactor from the line 4, to effect reaction, while keeping the reactor at 140° C. under 100 kg./cm.$^2$ gage. At every 70 hours, 13 kg. of the same aluminum activated in advance as above was supplied to the aluminum-packed layer 8 through the aluminum-feeding device 11. After the reaction was brought into a stationary state, 2.4 kg./hr. of alkyl-aluminum compounds consisting of 80% by weight of triisobutylaluminum and 20% by weight of diisobutylaluminum hydride was obtained from the upper part of the reactor through the line 5. The reaction was carried out without any trouble, and no aluminum residue made finer by the reaction was observed in the formed alkylaluminum compounds almost at all.

EXAMPLE 2

35 kilograms of the same aluminum as used in Example 1 was packed in the same reactor as used in Example 1, and triisobutylaluminum containing 1% potassium tert.-butoxide was fed thereto to such an extent that the aluminum was dipped therein. Activation was carried out at a temperature of 140° C. under a pressure of 50 kg./cm.$^2$ gage. Then, hydrogen gas was introduced into the lower part of the reactor from the line 3, and compressed to 100 kg./cm.$^2$ gage. 7.2 kg./hr. of triisobutylaluminum as a catalyst was introduced to the lower part of the reactor through the line 2, while keeping the reactor at 140° C. under 100 kg./cm.$^2$ gage. At every 120 hours, 13 kg. of the same aluminum activated in advance as above was supplied to the aluminum packed layer from the feeding device 11. After the reaction was brought into a stationary state, 70 kg./hr. of alkylaluminum compounds consisting of 70.5% by weight of triisobutylaluminum and 29.5% by weight of diisobutylaluminum hydride was obtained from the upper part of the reactor through the line 5. The reaction was continuously carried out without any trouble, and no aluminum residue made finer by the reaction was observed in the formed alkylaluminum compounds almost at all.

What is claimed is:

1. In a process for synthesizing a dialkylaluminum hydride, by reacting aluminum and hydrogen in the presence of a trialkylaluminum as a catalyst, an improved process for continuously synthesizing a dialkyaluminum hydride, which comprises introducing a trialkylaluminum as a catalyst and hydrogen to the lower part of a column-type reactor packed with aluminum cut pieces having an apparent specific surface area of not more than 60 cm.$^2$/g., effecting reaction at reaction temperature of 100°–200° C. under a reaction pressure of 40–300 kg./cm.$^2$ and withdrawing the thus formed dialkylaluminum hydride from the upper part of the reactor.

2. A process according to claim 1, wherein the aluminum cut pieces have an apparent specific surface area of 50–10 cm.$^2$/g.

3. A process according to claim 1, wherein the reaction temperature is 110°–160° C. and the reaction pressure is 50–150 gk./cm.$^2$.

4. In a process for synthesizing a trialkylaluminum by reacting aluminum hydrogen and an olefin in the presence of a trialkylaluminum as a catalyst, an improved process for continuously synthesizing a trialklaluminum, which comprises introducing a trialkylaluminum as a catalyst, hydrogen and an olefin to the lower part of a column-type reactor packed with aluminum cut pieces having an apparent specific surface area of not more than 60 cm.$^2$/g. in a molar ratio of the olefins of the trialkylaluminum of 0.5–50, effecting reaction at reaction temperature of 100°–200° C. under a reaction temperature of 40–300 kg./cm.$^2$, and withdrawing the thus formed trialkylaluminum from the upper part of the reactor.

5. A process according to claim 4, wherein the aluminum cut pieces have an apparent specific surface area of 50–10 cm.$^2$/g.

6. A process according to claim 4, wherein the reaction temperature is 110°–160° C. and the reaction temperature is 50–150 gk./cm.$^2$.

7. A process according to claim 4, wherein the olefin is at least one member selected from the group consisting of ethylene, propylene, isobutylene, butene-1, 2-ethylhexene-1, 3-methylhexene-1, 2-methyl - 4 - methylpentene-1, butene-2 and octene-2.

References Cited

UNITED STATES PATENTS

| | | | |
|---|---|---|---|
| 3,000,919 | 9/1961 | Hetroff et al. | 260—448 A |
| 3,388,142 | 6/1968 | Cameron et al. | 260—448 A |

TOBIAS E. LEVOW, Primary Examiner

H. M. S. SNEED, Assistant Examiner

UNITED STATES PATENT OFFICE
CERTIFICATE OF CORRECTION

Patent No. 3,652,621　　　　　　　　　Dated March 28, 1972

Inventor(s) EIICHI ICHIKI et al.

It is certified that error appears in the above-identified patent and that said Letters Patent are hereby corrected as shown below:

Please insert the following missing claim for priority:

--Japanese No. 75103/66 of November 14, 1966--

Signed and sealed this 3rd day of October 1972.

(SEAL)
Attest:

EDWARD M. FLETCHER, JR.　　　　　　　ROBERT GOTTSCHALK
Attesting Officer　　　　　　　　　　Commissioner of Patents